(12) United States Patent
Ma

(10) Patent No.: US 10,618,390 B1
(45) Date of Patent: Apr. 14, 2020

(54) MULTI-POSITION CLAMP ASSEMBLY AND TONNEAU COVER

(71) Applicant: Winbo-Dongjian Automotive Technology Co. Ltd., Foshan (CN)

(72) Inventor: Yongtao Ma, Foshan (CN)

(73) Assignee: Winbo-Dongjian Automotive Technology Co. Ltd., Foshan (CN)

( * ) Notice: Subject to any disclaimer, the term of this patent is extended or adjusted under 35 U.S.C. 154(b) by 0 days.

(21) Appl. No.: 16/138,190

(22) Filed: Sep. 21, 2018

(51) Int. Cl.
  *B60J 7/185* (2006.01)
  *B60J 7/10* (2006.01)

(52) U.S. Cl.
  CPC .............. *B60J 7/104* (2013.01); *B60J 7/185* (2013.01); *B60J 7/1858* (2013.01)

(58) Field of Classification Search
  CPC ... B60J 7/141; B60J 7/194; B60J 7/198; B60J 7/1607; B60J 7/185; B60J 7/1858; B60J 7/19
  USPC .......................... 296/100.04, 100.07, 100.16
  See application file for complete search history.

(56) References Cited

U.S. PATENT DOCUMENTS

| | | | |
|---|---|---|---|
| 7,188,888 B2 | 3/2007 | Wheatley et al. | |
| 7,334,830 B2 | 2/2008 | Weldy | |
| 7,905,536 B2 | 3/2011 | Yue | |
| 8,256,824 B2 | 9/2012 | Williamson et al. | |
| 8,366,173 B2 | 2/2013 | Xu | |
| 8,480,154 B2 | 7/2013 | Yue | |
| 8,511,736 B2 | 8/2013 | Williamson et al. | |
| 8,657,358 B2 | 2/2014 | Garska | |
| 8,807,625 B2 | 8/2014 | Garska | |
| 9,630,479 B2 | 4/2017 | Facchinello et al. | |
| 10,232,691 B1 * | 3/2019 | Weng | B60J 7/198 |
| 10,399,421 B2 * | 9/2019 | Smith | B60P 7/04 |

\* cited by examiner

*Primary Examiner* — Dennis H Pedder
(74) *Attorney, Agent, or Firm* — Eric J. Sosenko; Jonathan P. O'Brien; Honigman LLP

(57) ABSTRACT

A tonneau cover for covering the cargo box of a pickup truck. The tonneau cover includes a frame, a cover and a clamp assembly. The frame includes opposing side rails, opposing end rails, and at least one cross bow that extends between the opposing side rails. The cross bow also includes portions defining a multiple mounting regions. The clamp assembly is configured for selective mounting to the cross bow in one of the mounting regions and is rotatably moveable about the cross bow between a use position and a nonuse position, while mounted in any of the mounting regions.

19 Claims, 8 Drawing Sheets

MULTI-POSITION CLAMP ASSEMBLY AND TONNEAU COVER

BACKGROUND

1. Field of the Invention

The present invention generally relates to tonneau covers. More specifically, the invention relates to a clamp assembly for selectively securing a tonneau cover to the bed or cargo box of a pickup truck.

2. Description of Related Art

Tonneau covers for covering the cargo boxes, also referred to as a bed, of pickup trucks are well known for protecting the contents in the cargo box from environmental factors, shielding such contents from view and/or for enhancing the aesthetics of the pickup truck. Generally, tonneau covers are movable so as to selectively close off or provide access to the cargo box, without requiring complete removal of the tonneau cover. In this regard, the tonneau covers are typically of a roll-up variety, a tilting variety or a folding variety.

Regarding the tiltable and foldable varieties of tonneau covers, the varieties typically include a frame disposed about the upper surfaces of the side and end bed rails of the cargo box with transverse bows extending between the side rails. If of the foldable variety, one or more hinged connections are provided in the frame to allow the tonneau cover to progressively fold upon itself in a direction typically proceeding from the tailgate toward the cab of the pickup truck.

To cover the open areas between the various frame members of the tonneau cover, the tonneau cover may be provided with a flexible cover extending over the frame. This is generally known as a soft-top tonneau cover. Alternatively, the tonneau cover may be provided with one or more rigid panels between the frame members. This is often referred to as a hardtop tonneau cover. In either instance, a clamp assembly is typically located toward the rear of the tonneau cover (generally adjacent to the tailgate of the pickup truck). This clamp assembly provides quick and easy engagement and disengagement of the rear section of the tonneau cover with and from the cargo box, thereby allowing the tonneau cover to be folded or secured over the cargo box.

While many clamp assemblies work for their intended purposes of securing the tonneau cover and allowing it to be folded, there is always a need to improve upon the functionality and workability of the clamp assembly.

SUMMARY

In satisfying the above need, as well as overcoming various drawbacks and other limitations of the related art, the present invention provides a tonneau cover for covering the cargo box of a pickup truck.

In one aspect of the invention, a tonneau cover is provided for covering the cargo box of a pickup truck. The tonneau cover includes a frame, a cover and a clamp assembly. The frame includes opposing side rails, opposing end rails, and at least one cross bow that extends between the opposing side rails. The cross bow also includes portions defining multiple mounting regions. A cover extends over the frame, between the side rails and end rails and is supported by the cross bow. A clamp assembly, configured for selective mounting to the cross bow in one of the mounting regions, is mounted to the cross bow and is rotatably moveable about the cross bow between a use position and a nonuse position while being mounted in either of the mounting regions.

In another aspect, the mounting regions are discrete from one another.

In another aspect, an abutment is located between the mounting regions.

In a further aspect, the abutment prevents sliding movement of the mounting member between the mounting regions.

In an additional aspect, the abutment defines a raised surface relative to surfaces of the mounting regions.

In yet another aspect, the mounting regions have a first effective diameter and the abutment has a second effective diameter, the second effective diameter being greater than the first effective diameter.

In still a further aspect, the mounting regions are defined at least in part by circular surfaces.

An additional aspect, the clamp assembly includes a mounting member that substantially encircles the cross bow and is removable therefrom.

In another aspect, the mounting member encircles the cross bow at one of the mounting regions.

In yet a further aspect, the mounting member is coupled to a clamp jaw, the clamp jaw being moveable relative to the mounting member.

Still an additional aspect, the mounting member defines an inner diameter that is greater than an effective diameter defined by any of the mounting regions.

In yet another aspect, the mounting member is coupled to a clamp jaw by a support bar extending from the mounting member.

In a further aspect, the clamp jaw is axially moveable along the support bar.

In an additional aspect, the support bar is pivotally coupled to the mounting member.

In another aspect, the support bar is pivotally coupled to the mounting bar so as to pivot between a transverse orientation and a parallel orientation, the transvers and parallel orientations being defined relative to the cross bow.

In yet another aspect, in the cross bow include a retainer, the support bar engaging the retainer in the parallel orientation.

In still a further aspect, the retainer is engaged with the support bar in a snap-fit engagement.

An additional aspect, an abutment is located between the mounting regions, the clamp assembly including a mounting member defining an inner diameter that is greater than an effective diameter defined by any of the mounting regions, the inner diameter defined by the mounting member being less than an effective diameter defined by the abutment.

In another aspect, the clamp assembly further includes a support bar pivotally coupled to the mounting member, a clamp jaw supported by and moveable along the support bar, and a clamp actuator coupled to the support bar In a further aspect, the clamp actuator is a clamp handle including a portion defining a cam surface contacting the clamp jaw and operable to move the clamp jaw along the support bar during pivoting of the clamp handle relative to the support bar.

Further objects, features and advantages of this invention will become readily apparent to persons skilled in the art after review of the description provided herein with reference to the drawings and claims that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an access is designated in the figures. An axial surface is one that faces in the axial direction. In other words, an axial surface faces in a direction along the central axis. A radial surface therefore faces radially, either away from or toward the central axis. It will be understood, however, that in actual implementation, the directional references used herein may not necessarily correspond with the installation and orientation of the corresponding components or device.

Figure 1:
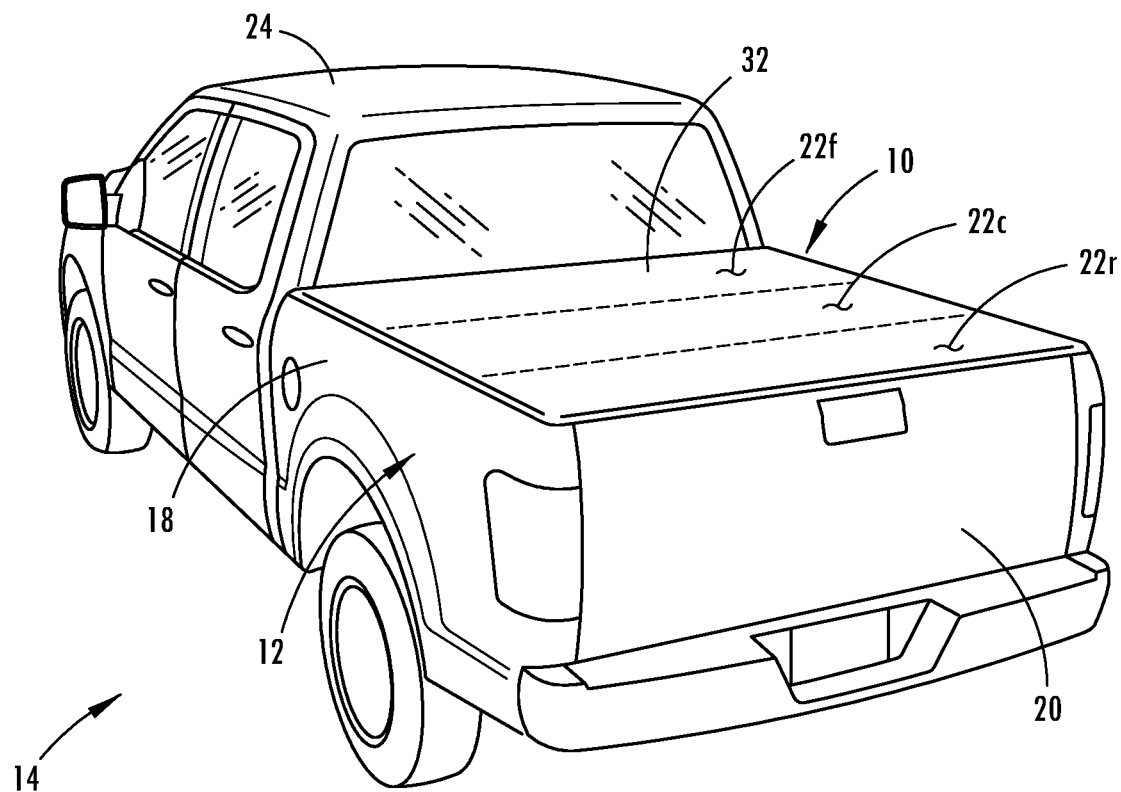
FIG. 1 is a perspective view of a pickup truck with a tonneau cover positioned over the cargo box of the pickup truck.

Referring now to the drawings, shown in FIG. 1, and designated at 10, is a tonneau cover disposed over the cargo box/bed 12 of a pickup truck 14. The tonneau cover 10 is supported over the cargo box 12 on the upper surfaces 16 of the various walls defining the cargo box 12. Those walls include the bed sidewalls 18, the bed front wall (not shown) and the tailgate 20.

While the tonneau cover 10 may be of the tilting variety mentioned above, for the purposes of the following discussion, but not intended to be limited thereby, the various aspects and features embodying the principles of the present invention will be described in the context of a folding, soft-top tonneau cover.

The tonneau cover 10, as seen in FIG. 1, is unfolded and in its fully extended position. In this position, it will be appreciated that the tonneau cover 10 substantially covers the upper opening into the cargo box 12. In a tri-fold embodiment, the tonneau cover 10 is comprised of three portions that are foldable over one another so as to selectively uncover some or all of the cargo box 12. In the folded position, a rear portion 22r (located closest to the tailgate 20) is folded onto a center portion 22c, and then both of the rear and center portions 22r, 22c are folded together onto the front portion 22f, which is located closest to the cab 24 of the pickup 14. Since the folding aspect of the tonneau cover 10 is not the particular focus hereof, the folded positions of the tonneau cover 10 are not illustrated in connection with the present description. Notwithstanding the above, and in the interest of completeness, general aspects of the tonneau cover 10, and its ability to fold, are variously discussed herein.

Generally, the tonneau cover 10 is bounded about its perimeter by a series of frame members. These frame members include side frame members 26 overlying the bed sidewalls 18, a front frame member (not shown) overlying the front end wall and a rear frame member (also not shown) overlying the tailgate 20. Extending between the side frame members 26, at spaced apart locations there along, are cross bows 28. Preferably, at least one cross bow 28 is provided in each of the rear, center and front portions 22r, 22c, 22f of the tonneau cover 10. The cross bows 28 may be centered relative to their respective portions of the tonneau cover 10 or may be offset to the rear or front of their respective portions. Collectively, the frame members and the cross bows 28 make up the skeletal framework or frame 30 of the tonneau cover 10.

Extended over and supported by the frame 30 is a flexible cover 32, which is typically constructed of a vinyl coated polyester fabric but may be formed of other materials. The perimeter of the cover 32 is provided with an attachment strip 34 that engages with corresponding features of the frame members to retain the cover 32 to the frame 30. While illustrated and discussed as have a flexible cover 32, it will be appreciated that the cover 32 may be formed as a rigid cover made of metal, such as aluminum, or another rigid material.

To enable folding of the tonneau cover 10, the side frame members 26 are made up of a plurality of frame segments, three in a tri-fold construction, that are connected together by hinge assemblies. Frame segments connected by hinge assemblies are well known in the field of folding tonneau covers and a number of different possible construction will be readily appreciated by those skilled in the art. For those reasons, these structures are not further described herein.

At the corner intersections of the front, side and rear frame members, corner members interconnect the frame members to one another. Such corner members are likewise well known.

Figure 8:
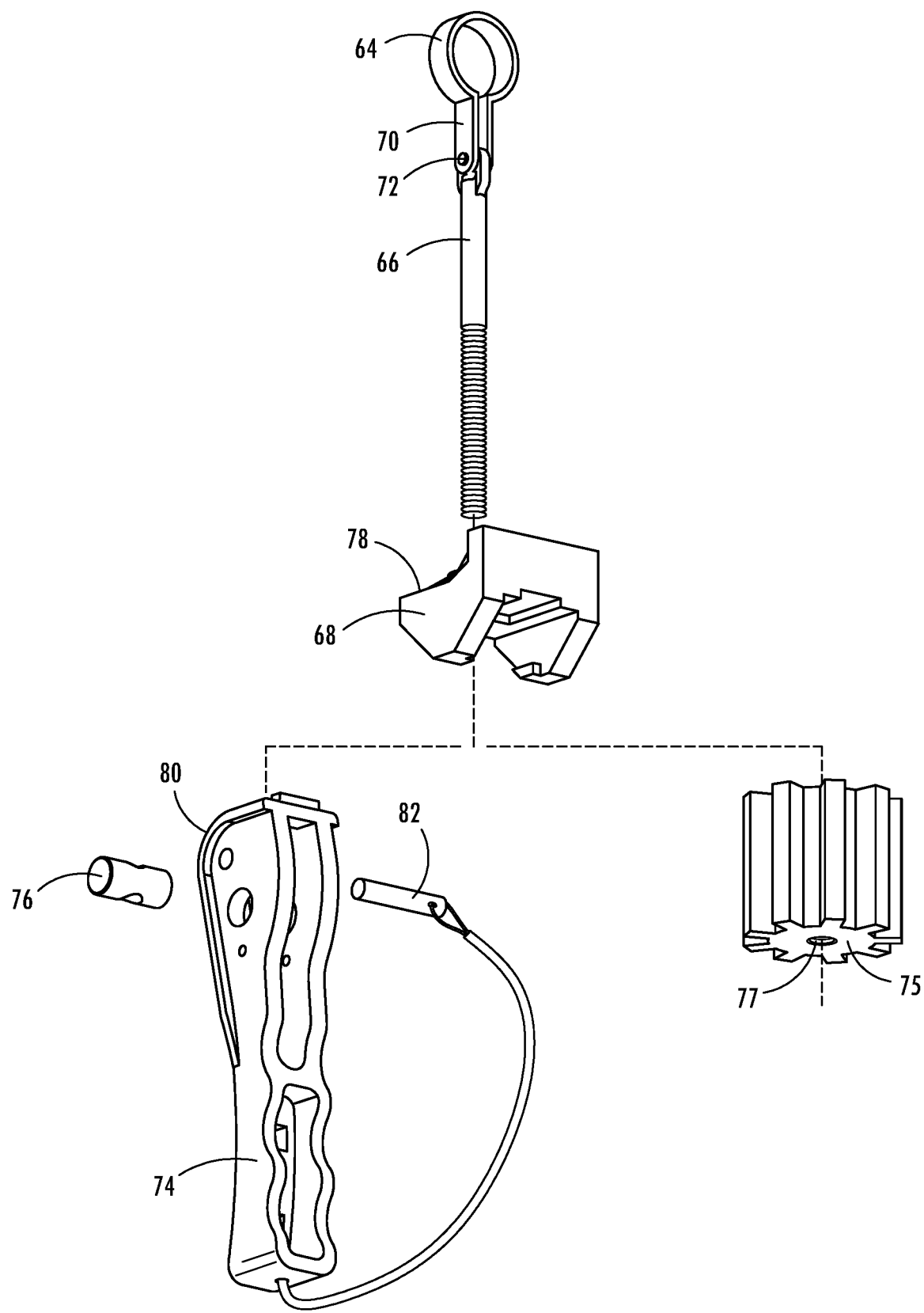
FIG. 8 is an exploded view showing alternate constructions of the clamp assembly.

Preferably, the tonneau cover 10 includes two sets of latch or clamp assemblies, a pair of front clamp assemblies (not shown) associated with the forward most cross bow 28 and a pair of rear clamp assemblies 36 associated with the rearmost cross bow 28. The front clamp assemblies may be of the same or similar construction as that of the rear clamp assemblies 36. Generally, however, the rear clamp assemblies 36 require a greater ease of operation since these assemblies must be disconnected in order for the tonneau cover 10 to be folded. The front clamp assemblies, once installed, can remain installed until the tonneau cover 10 needs to be removed, unless, of course, the tonneau cover 10 is designed such that the front portion 22f can be folded rearward. In that latter case, the front clamp assemblies must also be readily and easily engaged and disengaged. In view the above, the rear clamp assemblies 36 are described in detail herein, it being understood that the front clamp assemblies may have the same, a similar or different construction, such as including a rotatable knob 75 as an alternative clamp actuator, as seen in FIG. 8.

Figure 2:
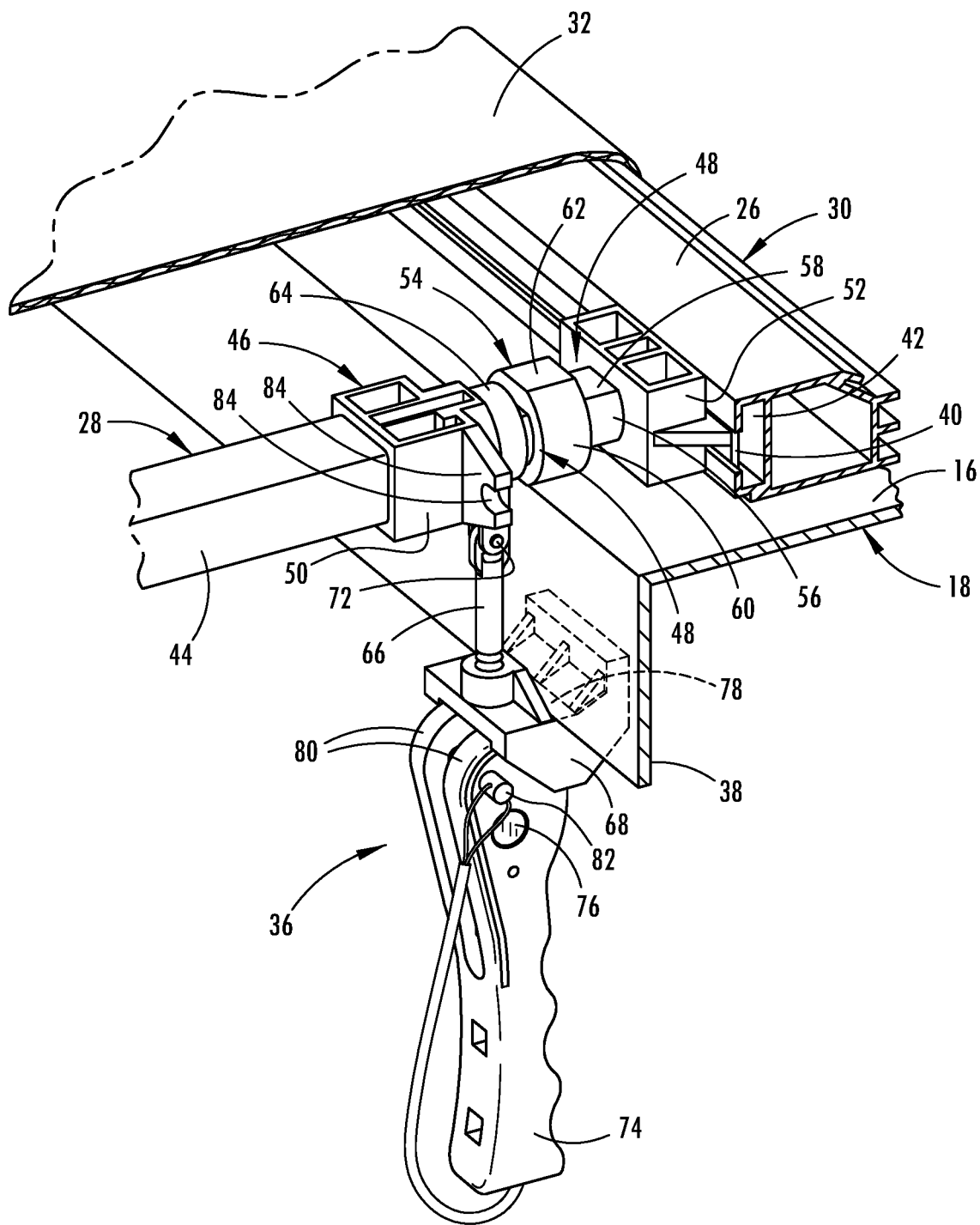
FIG. 2 is perspective view of a clamp assembly of the tonneau cover seen in FIG. 1 with the clamp assembly in a latched, use position.

Referring now to FIG. 2, one of a pair of rear clamp assemblies 36 is illustrated therein in a latched position. In this position, the clamp assembly 36 engages a downwardly extending inner flange 38 of the bed sidewall 18 so as to secure the tonneau cover 10 over the cargo box 12 of the pickup truck 14. The force applied to the flange 38 by the clamp assembly 36 pulls the remaining portions of the tonneau cover 10 downward, toward the upper surface 16 of the bed sidewall 18, thereby rigidly securing the tonneau cover 10 to the pickup truck 14.

As also seen in FIG. 2, the cross bow 28 is extended across the opening of the cargo box 12 and engaged with the side frame member 26. In the illustrated construction, the terminal end of the cross bow 28 is provided with a T-shaped retainer 40. The T-shaped retainer 40 is received in a slotted channel 42 of the side frame member 26. The dimension across the opening of the slot portion of the slotted channel 42 is smaller than the corresponding width of the cross bow of the T-shaped member 40. As a result, the T-shaped member 40 and the end of the cross bow 28 is captively retained in the slotted channel 42 of the side frame member 26. Notably, this captive retention is such that the cross bow 28 may be slid along the slotted channel 42, therefore forward and rearward relative to the cargo box 12, when the clamp assembly 36 is in its unlatched or disengaged position.

The cross bow 28 itself includes a support member 44 and end pieces 46. The support member 44 principally spans the gap between the opposing bed sidewalls 18, while the end pieces 46 are mounted at the opposing ends of the support member 44. The T-shaped retainer 40 mentioned above is preferably formed as the terminal portion of each of the end pieces 46.

The support member 44 is formed of a light weight material that is strong enough to support the cover 32 and aid in maintaining rigidity of the frame 30 and the three portions 22 of the tonneau cover 10 during folding and unfolding of the tonneau cover 10. As such, metal materials, for example aluminum, are preferred, but other materials meeting the above criteria could also be utilized.

The end pieces 46 are preferably formed of injection molded reinforced nylon and formed in place on the ends of the support member 44. Alternatively, the end pieces 46 may include a bore allowing the end pieces 46 to be inserted onto the ends of the support member 44. In the latter instance the end pieces 46 may be retained with the support member 44 through the use of adhesives or mechanical means, including resilient tabs provided on the end pieces 46 and engaging in openings provided in the support member 44.

Figure 3:
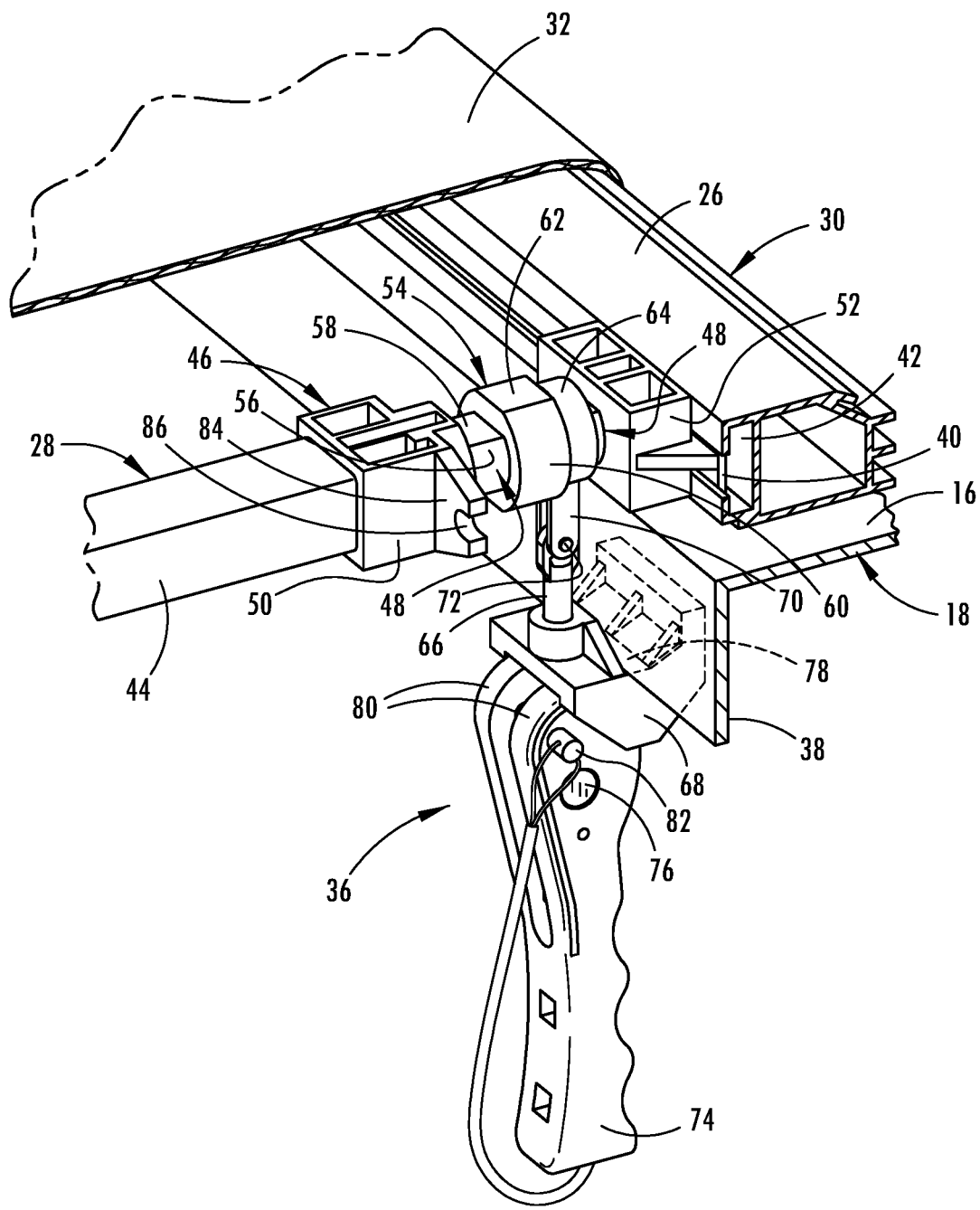
FIG. 3 is perspective view of the clamp assembly of the tonneau cover seen in FIG. 1, with the clamp assembly in a second latched, use position.
Figure 4:
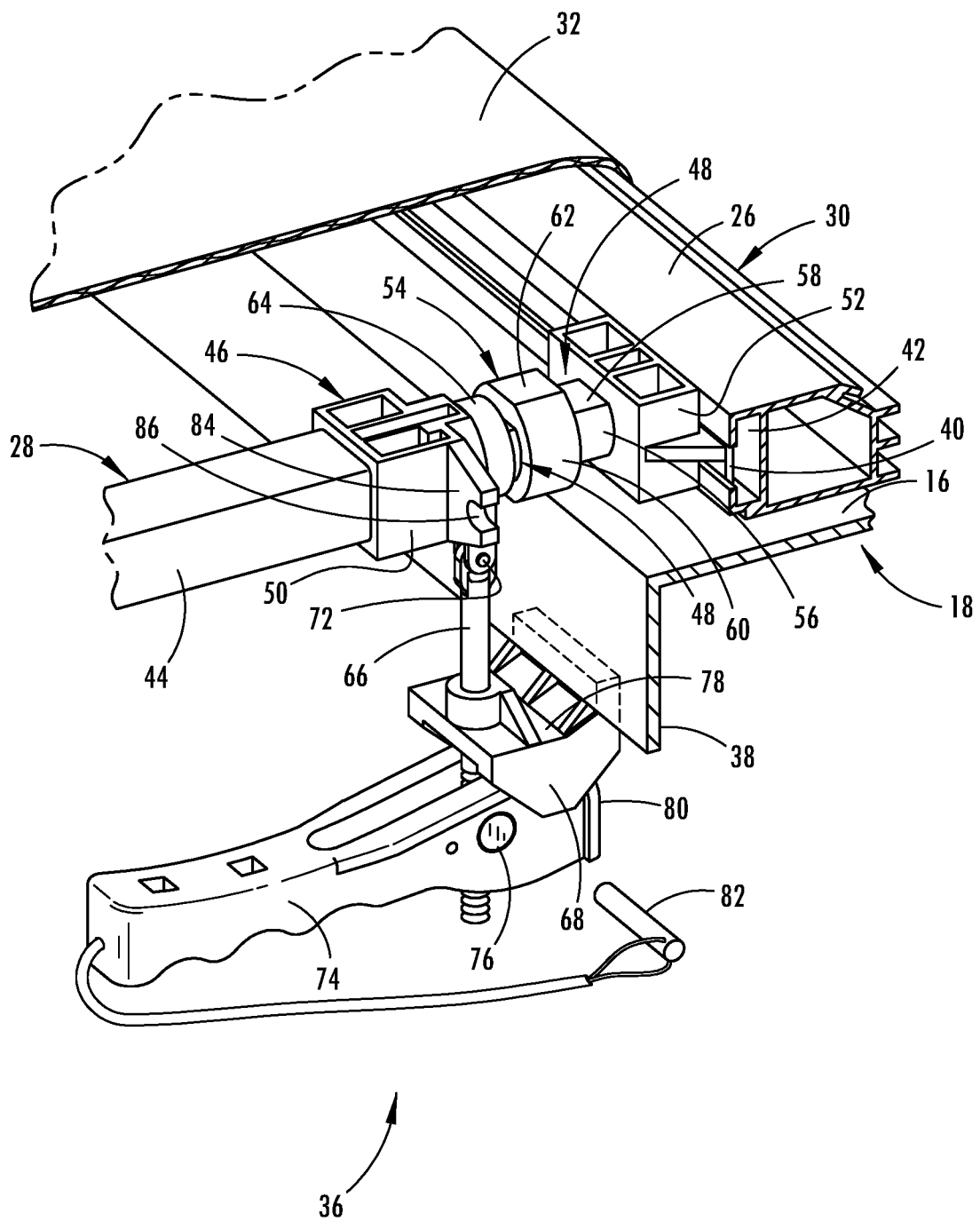
FIG. 4 is a perspective view of the clamp assembly, as seen in FIG. 2, with the latch assembly in an unlatched, use position.

The end pieces 46 are provided with multiple spaced apart mounting regions 48 at which the clamp assembly 36 may be secured. The mounting regions 48 are axially spaced along the length of the cross bow 28. This allows for the clamp assemblies 36 on the opposing ends of the cross bow 28 to be mounted in positions accommodating cargo boxes 12 different widths. As seen in FIG. 2, the clamp assembly 36 is mounted in a narrow width position, which is defined by the mounting region 48 located closer to the support member 44 of the cross bow 28. This allows the tonneau cover 10 to be mounted to a cargo box 12 in which the upper surface 16 of the bed sidewall 18 has a relatively wide width. In FIG. 3, the clamp assembly 36 is mounted in a wide width position, which is defined by the mounting region 48 located closest to the side frame member 26 of the frame 30. This position allows the tonneau cover 10 to be mounted to a cargo box 12 in which the upper surface 16 of the bed sidewall 18 has a more narrow width. Accordingly, one tonneau cover 10 of a given width can be used in connection with multiple pickup trucks 14 having different width cargo boxes 12.

Figure 5:
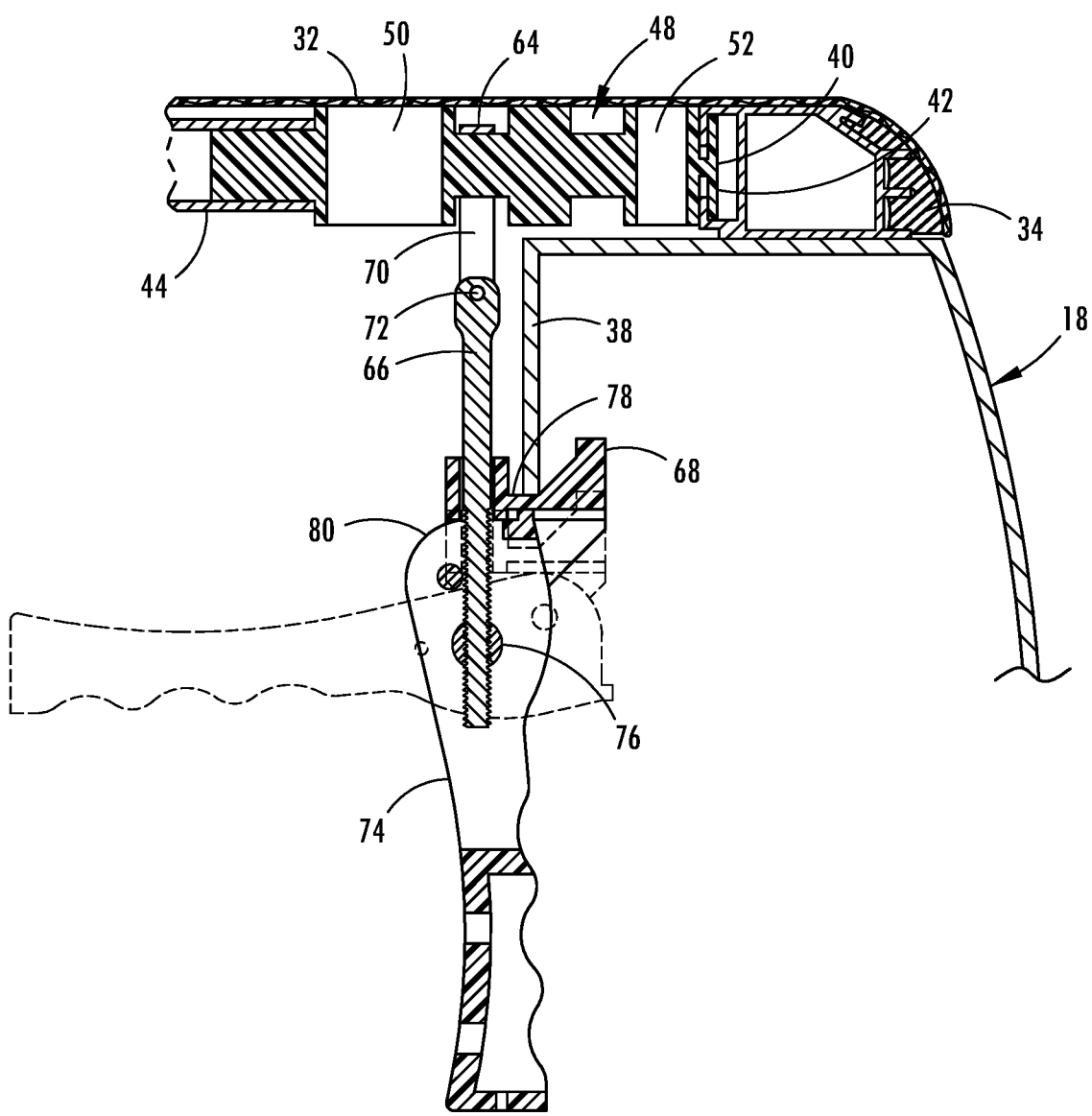
FIG. 5 is side sectional view showing the clamp assembly in a latched, use position and also showing, in phantom, the clamp assembly in an unlatched, use position.

In addition to the mounting regions 48, the end pieces 46 include mounting blocks 50, 52 on opposite ends of the end pieces 46, and an abutment 54 located between the mounting regions 48. The inner mounting block 50 is utilized to secure the end piece 46 to the support member 44, and the outer mounting block 52 is utilized to secure the end piece 46 to the side frame member 26 via the T-shaped retainer 40. The abutment 54, in conjunction with the mounting blocks 50, 52, operates to define the mounting regions 48 and prevent the clamp assembly 36 from sliding along the end piece 46 between the mounting regions 48. For this purpose, the abutment 54 defines an effective diameter (a diameter equal to the largest cross-sectional dimension of the component) that is greater than the effective diameters of the mounting regions 48. This difference in effective diameters is generally discernible from the cross sectional view of FIG. 5. However, it is noted that the effective diameters of the abutment 54 and the mounting regions 48 will be greater than that shown in FIG. 5 when the diameter is measured cross-sectional along an axis directed into the page of FIG. 5. This is further appreciated from the perspective views of FIGS. 2, 3, 4 and 6.

Preferably, the radial surface of each mounting region 48 defines at least one, and preferably two, partial circular surface 56. In this regard the full circumference of the radial surface need not define a circle so long as the non-circular portions of the surface do not define a greater radius than the circular surface 56. As seen in FIGS. 2 and 3, both of the radial surfaces of the outer and inner mounting regions 48 have chordal surfaces 58, namely surfaces defined by a plane in which lies a chord of the radial surface and a line on the radial surface that is perpendicular to the chord. In the illustrated embodiments, chordal surfaces 58 are provided on the uppermost and lower must portions of the radial surfaces of the mounting regions 48. Similarly, the abutment 54 includes a radial surface having a partial circular surface 60 and a chordal surface 62.

As previously noted, the clamp assembly 36 is supported by the cross bow 28 at one of the mounting regions 48. To achieve the above, the clamp assembly 36 includes a mounting ring 64 that extends substantially completely about the radial surface of the mounting regions 48. The mounting ring 64 is circular and has an inner diameter that is the substantially the same as or greater than the effective diameter of the mounting region 48. The diameter of the mounting ring 64, as used herein, is substantially the same as or greater than the effective diameter of the mounting region 48 if the mounting ring 48, and the clamp assembly 36, can be rotated about the cross bow 28, and more particularly rotated between use and nonuse positions.

Figure 6:
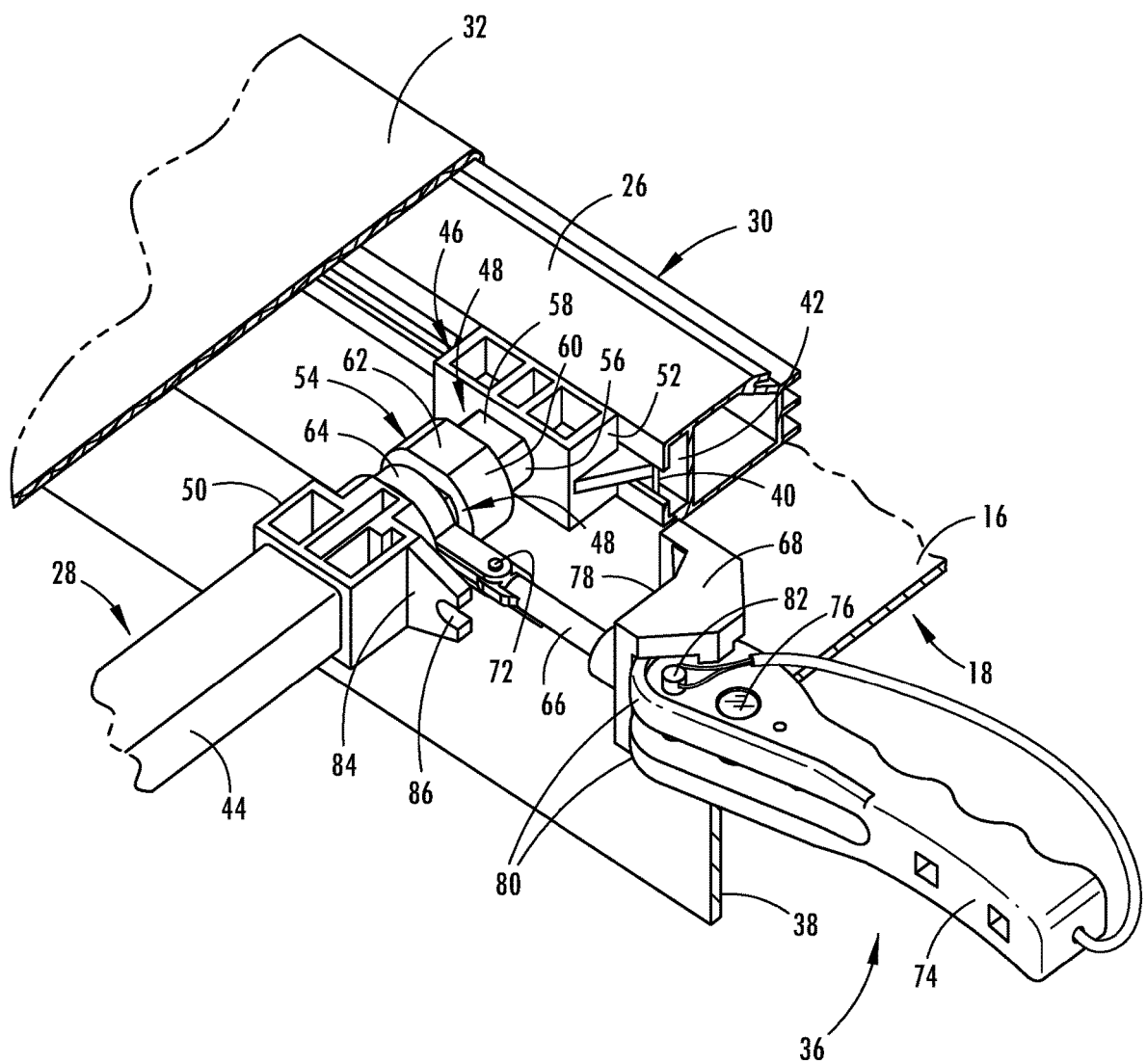
FIG. 6 is a perspective view of a clamp assembly of the tonneau cover seen in FIG. 1, with the clamp assembly in a nonuse position.

The use position of the clamp assembly 36 is a position where the clamp assembly 36 generally extends into the cargo box 12 can be moved between the unlatched and latched positions. The use position of the clamp assembly 36 is seen in FIGS. 2-5. The nonuse position of the clamp assembly 36 is a position where the clamp assembly 36 has been rotated approximately 90° from the use position toward the cover 32 of the tonneau cover 10. This position is seen in FIG. 6.

In addition to the mounting ring 64, the clamp assembly 36 includes a support bar 66 upon which a clamp jaw 68 is supported and freely movable, both in translation and rotation, their along. The support bar 66 is pivotally mounted at its upper end between radial flanges 70 extending from the mounting ring 64. In this regard, an upper pivot pin 72 extends through the radial flange is 70 and the end of the support bar 66. At the lower end of the support bar 66, beyond the clamp jaw 68, a clamp actuator is provided. In one embodiment, the clamp actuator is a clamp handle 74 and in another embodiment the claim actuator is a clamp knob 75.

The clamp handle 74 is pivotally mounted to the support bar 66. In mounting the clamp handle 74, a lower pivot pin 76, having an internally threaded bore provided transversely therein, extends through the clamp handle 74 perpendicular to the support bar 66. The end of the support bar 66 is correspondingly threaded and received in the threaded bore of the lower pivot pin 76. By rotating the lower pivot pin 76, and therefore the clamp handle 74, the positioning of the clamp handle 74 and the clamp jaw 68 along the support bar 66, and therefore the inner flange 38 of the bed sidewall 18, can be adjusted.

With the clamp jaw 68 adjusted along the support bar 66 to a position where the inner flange 38 is received within the crotch 78 of the clamp jaw 68, the clamp handle 74 can be rotated downward into the latched position where the clamp handle 74 is aligned with the support bar 66. The clamp handle 74 includes a cam surface 80 adjacent to the clamp jaw 68. Upon movement of the clamp handle 74 into the latched position, the cam surface 80 is configured to move the clamp jaw 68 along the support bar 66 towards the cross bow 28, captively retaining the inner flange 38 within the crotch 78 and thereby securing the tonneau cover 10 to the bed sidewall 18. Movement of the clamp assembly 36 from the latched position to the unlatched position is done in reverse.

If desired, a locking pin 82 may be provided with the clamp assembly 36. In the latched position, the locking pin 82 may be inserted into a bore through the clamp handle 74. In this position, the locking pin 82 interferes with the support bar 66 and prevents the clamp handle 74 from being moved from the latched position to the unlatched position.

The clamp knob 75, seen in FIG. 8, includes an internally threaded bore 77 in which threaded end of the support bar 66 is received. By rotating the clamp knob 75, the positioning of the clamp knob 75 and the clamp jaw 68 along the support bar 66 can be adjusted relative to the inner flange 38 of the bed sidewall 18.

Figure 7:
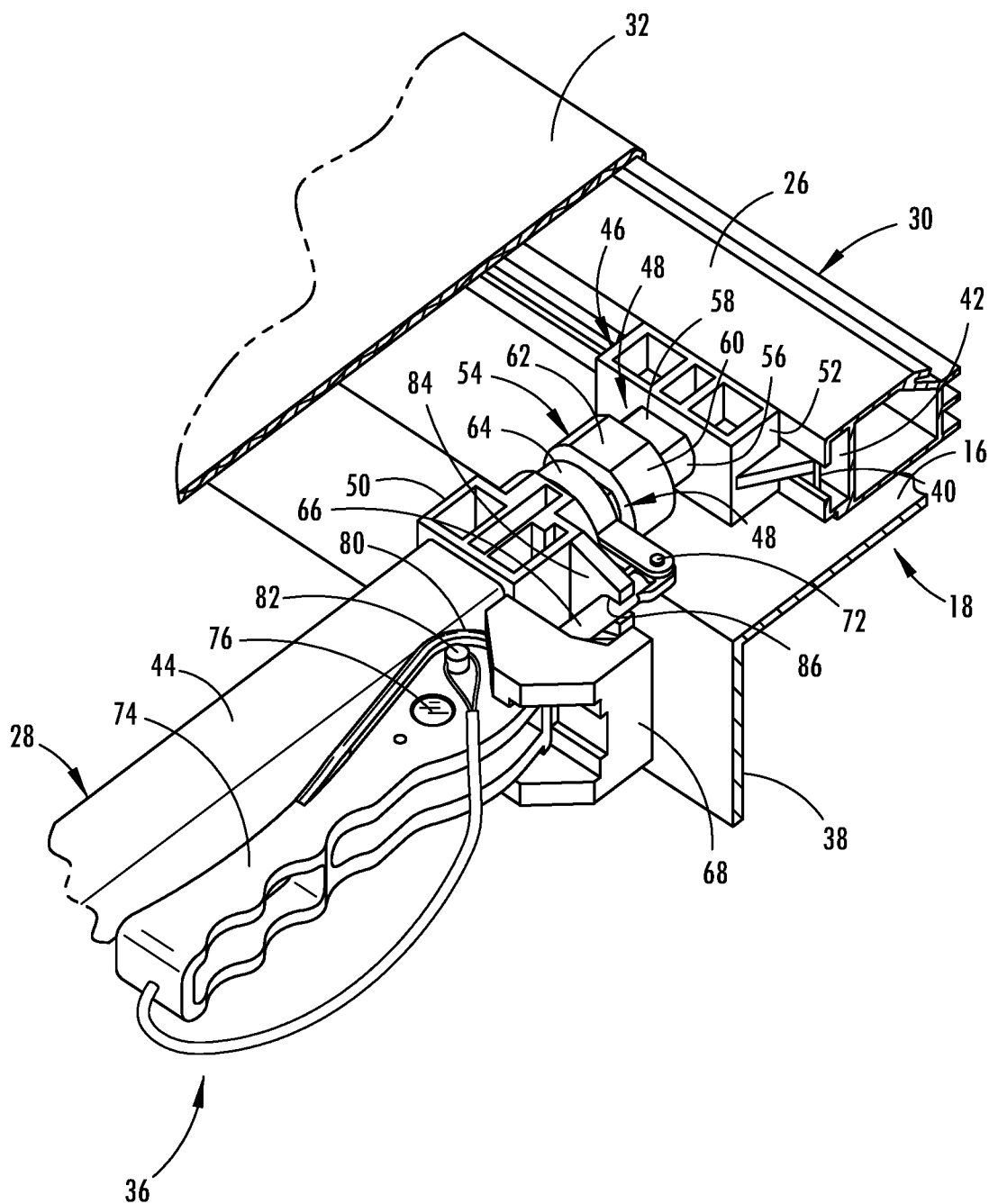
FIG. 7 is perspective view, showing the clamp assembly in a stowed position.

As discussed above, the nonuse position of the clamp assembly 36 is seen in FIG. 6. In this position, the clamp assembly 36 has been rotated 90° upward from the use position and lies adjacent to the cover 32 of the tonneau cover 10. From this position, the clamp assembly 36 can be moved to the stowed position seen in FIG. 7.

To retain the clamp assembly 36 in the stowed position, the end piece 46 is provided with a retainer 84. The retainer 84 is formed by a flange extending laterally from the inner mounting block 50 and provided with a C-shaped recess 86 at its lateral most extent. The diameter of the recess 86 approximates the diameter of the support bar 66 and the dimension of the opening into the C-shaped recess 86 is less than the diameter of the support bar 66. Pivoting the clamp assembly 36 about the upper pivot pin 72 from the nonuse position generally towards the cross bow 28 allows the support bar 66 to be received through the opening and retained in the C-shaped recess 86. In this position, the tonneau cover 10 can be folded without the clamp assembly 36 interfering with this folding or deforming the cover 32.

As noted above, the clamp assembly 36 is movable between two mounting regions 48 on the cross bow 28, and more particularly the end piece 46. As also noted above the abutment 54 prevents the clamp assembly 36 from sliding between the two mounting regions 48. To effectuate movement of the clamp assembly 36 between the mounting regions 48, the upper pivot pin 72 may be provided as a threaded fastener including a bolt and nut combination. By unthreading the nut from the bolt, the bolt may be removed allowing the end of the support bar 66 to be removed from between the radial flange is 70 of the mounting ring 64. The radial flange is 70 of the mounting ring may then be moved apart or separated so as to open up the mounting ring 64, allowing it to be removed from the mounting region 48 of the end piece 46. In this regard, the chordal surfaces 58 of the radial surfaces of the mounting regions 48 reduce the extent to which the mounting ring 64 needs to be opened in order to be removed from the mounting regions 48 and the end pieces 46.

Once removed from one of the mounting regions 48, the mounting ring 64 may be moved, opened and placed over the other mounting region 48. Once positioned over the other mounting region 48, the upper end of the support bar 66 is positioned between the radial flange is 70 of the mounting ring 64 and the upper pivot pin 72 is reinserted through the corresponding openings of the radial flange is 70 and the upper end of the support bar 66. The upper pivot pin 72 is then secured, such as through the engagement of a nut with the threaded end of a bolt, thereby securing the support bar 66 and additional portions of the clamp assembly 36 to the mounting ring 64.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A tonneau cover for covering a cargo box of a pickup truck, the tonneau cover comprising:
a frame having opposing side rails, opposing end rails, and at least one cross bow extending between the opposing side rails, the cross bow including multiple mounting regions defined by outward facing circumferential surfaces, each of the mounting regions being separated by an abutment;
a cover extending over the frame between the side rails and end rails and supported by the cross bow; and
a clamp assembly, the clamp assembly being configured for alternative and removable mounting to the cross bow in one of the mounting regions, the clamp assembly also being rotatably coupled to the cross bow and rotatable about the cross bow between a use position and a nonuse position while mounted in either of the mounting regions.

2. The tonneau cover according to claim 1, wherein the abutment prevents sliding movement of the mounting member between the mounting regions.

3. The tonneau cover according to claim 1, wherein the abutment defines a raised surface relative to surfaces of the mounting regions.

4. A tonneau cover for covering a cargo box of a pickup truck, the tonneau cover comprising:
a frame having opposing side rails, opposing end rails, and at least one cross bow extending between the opposing side rails, the cross bow including multiple mounting regions and an abutment being located between the mounting regions;

a cover extending over the frame between the side rails and end rails and supported by the cross bow; and a clamp assembly, the clamp assembly being configured for alternative and removable mounting to the cross bow in one of the mounting regions, the clamp assembly also being rotatably coupled to the cross bow and rotatable about the cross bow between a use position and a nonuse position while mounted in either of the mounting regions, the mounting regions having a first effective diameter and the abutment having a second effective diameter, the second effective diameter being greater than the first effective diameter.

5. The tonneau cover according to claim 1, wherein the mounting regions are defined at least in part by circular surfaces.

6. The tonneau cover according to claim 1, wherein the clamp assembly includes a mounting member that substantially encircles the cross bow and is removable therefrom.

7. The tonneau cover according to claim 6, wherein the mounting member encircles the cross bow at one of the mounting regions.

8. The tonneau cover according to claim 6, wherein the mounting member is coupled to a clamp jaw, the clamp jaw being moveable relative to the mounting member.

9. The tonneau cover according to claim 6, wherein the mounting member defines an inner diameter that is greater than an effective diameter defined by any of the mounting regions.

10. The tonneau cover according to claim 6, wherein the mounting member is coupled to a clamp jaw by a support bar extending from the mounting member.

11. The tonneau cover according to claim 10, wherein the clamp jaw is axially moveable along the support bar.

12. The tonneau cover according to claim 10, wherein the support bar is pivotally coupled to the mounting member.

13. The tonneau cover according to claim 10, wherein the support bar is pivotally coupled to the mounting member so as to pivot between a transverse orientation and a parallel orientation, the transverse and parallel orientations being defined relative to the cross bow.

14. The tonneau cover according to claim 10, wherein in the cross bow include a retainer, the support bar engaging the retainer in the parallel orientation.

15. The tonneau cover according to claim 14, wherein the retainer is engaged with the support bar in a snap-fit engagement.

16. A tonneau cover for covering a cargo box of a pickup truck, the tonneau cover comprising:

a frame having opposing side rails, opposing end rails, and at least one cross bow extending between the opposing side rails, the cross bow including multiple mounting regions and an abutment being located between the mounting regions;

a cover extending over the frame between the side rails and end rails and supported by the cross bow; and a clamp assembly, the clamp assembly being configured for alternative and removable mounting to the cross bow in one of the mounting regions, the clamp assembly also being rotatably coupled to the cross bow and rotatable about the cross bow between a use position and a nonuse position while mounted in either of the mounting regions, the clamp assembly further including a mounting member defining an inner diameter that is greater than an effective diameter defined by any of the mounting regions, the inner diameter defined by the mounting member being less than an effective diameter defined by the abutment.

17. The tonneau cover according to claim 16, wherein the clamp assembly further includes a support bar pivotally coupled to the mounting member, a clamp jaw supported by and moveable along the support bar, and a clamp actuator coupled to the support bar.

18. The tonneau cover according to claim 17, wherein the clamp actuator is pivotal clamp handle, the clamp handle including a portion defining a cam surface contacting the clamp jaw and operable to move the clamp jaw along the support bar during pivoting of the clamp handle relative to the support bar.

19. The tonneau cover according to claim 17, wherein the clamp actuator is rotatable clamp knob, the clamp knob being threadably engaged with the support bar and being operable to move the clamp jaw along the support bar during rotation of the clamp knob relative to the support bar.

\* \* \* \* \*